United States Patent
Yoshida

(10) Patent No.: US 8,091,664 B2
(45) Date of Patent: Jan. 10, 2012

(54) FUEL CELL VEHICLE

(75) Inventor: Naohiro Yoshida, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 185 days.

(21) Appl. No.: 11/988,686

(22) PCT Filed: Aug. 2, 2006

(86) PCT No.: PCT/IB2006/002101
§ 371 (c)(1),
(2), (4) Date: Jan. 11, 2008

(87) PCT Pub. No.: WO2007/015147
PCT Pub. Date: Feb. 8, 2007

(65) Prior Publication Data
US 2009/0145678 A1    Jun. 11, 2009

(30) Foreign Application Priority Data
Aug. 4, 2005  (JP) .................. 2005-226223

(51) Int. Cl.
B60W 10/28    (2006.01)
(52) U.S. Cl. .................. 180/65.275; 180/65.31
(58) Field of Classification Search ............ 180/65.21, 180/65.265, 65.275, 65.29, 65.31; 903/907, 903/908, 944
See application file for complete search history.

(56) References Cited

U.S. PATENT DOCUMENTS

| | | | |
|---|---|---|---|
| 5,065,320 A * | 11/1991 | Hayashi et al. ................. 701/1 |
| 5,631,532 A * | 5/1997 | Azuma et al. ................. 320/102 |
| 6,684,135 B2 * | 1/2004 | Uenodai et al. ................. 701/22 |
| 6,874,588 B2 * | 4/2005 | Kato et al. ................. 429/13 |
| 7,059,436 B2 * | 6/2006 | Iwasaki ................. 429/13 |
| 7,180,017 B2 * | 2/2007 | Hein ................. 200/5 R |
| 7,207,405 B2 * | 4/2007 | Reid et al. ................. 180/65.31 |
| 7,208,241 B2 * | 4/2007 | Edlund et al. ................. 429/19 |
| 7,325,561 B2 * | 2/2008 | Mathison et al. ................. 137/256 |
| 2001/0052433 A1 | 12/2001 | Harris et al. |
| 2002/0192519 A1 | 12/2002 | Fujita et al. |

(Continued)

FOREIGN PATENT DOCUMENTS

CN   1567635 A   1/2005

(Continued)

OTHER PUBLICATIONS

Office Action issued Feb. 23, 2011 in JP 2005-226223 & English translation thereof.

(Continued)

*Primary Examiner* — John Walters
(74) *Attorney, Agent, or Firm* — Kenyon & Kenyon LLP

(57) ABSTRACT

A movable body includes a fuel cell, a fuel supply means which supplies fuel containing hydrogen to the fuel cell, a limit means which limits the amount of the supplied fuel, a body which includes a space in which an occupant is housed, a conversion means which converts the supplied electric power from the fuel cell to driving force for driving the body, a control portion which controls the operation of the conversion means, and an operating member. The operating member is disposed at a position where the operating member can be operated by the occupant housed in the body, and provides an instruction to execute a control that limits the amount of the supplied fuel using the limit means, without stopping the operation of the control portion.

11 Claims, 3 Drawing Sheets

U.S. PATENT DOCUMENTS

| | | |
|---|---|---|
| 2003/0062204 A1 | 4/2003 | Kato et al. |
| 2004/0017175 A1 | 1/2004 | Lee et al. |
| 2005/0133347 A1 | 6/2005 | Hein |

FOREIGN PATENT DOCUMENTS

| | | |
|---|---|---|
| DE | 197 31 250 A1 | 1/1998 |
| EP | 1 419 926 A2 | 5/2004 |
| JP | 58-081111 U | 6/1983 |
| JP | 09-190278 A | 7/1997 |
| JP | 2000-021430 A | 1/2000 |
| JP | 2000-025489 A | 1/2000 |
| JP | 2001-069610 A | 3/2001 |
| JP | 2001-222924 A | 8/2001 |
| JP | 2001-351667 A | 12/2001 |
| JP | 2003-204583 A | 7/2003 |
| JP | 2004-039548 A | 2/2004 |
| JP | 2004-311222 A | 11/2004 |
| JP | 2005-011703 A | 1/2005 |
| JP | 2005-033996 A | 2/2005 |
| JP | 2004-327101 A | 10/2010 |
| WO | WO 01/79012 A2 | 10/2001 |
| WO | WO 2004/095617 A1 | 4/2004 |
| WO | 2005/010427 A1 | 2/2005 |

OTHER PUBLICATIONS

Office Action received Aug. 19, 2010 in related German Patent Application and English translation thereof.

* cited by examiner

FUEL CELL VEHICLE

This is a 371 national phase application of PCT/IB2006/002101 filed 2 Aug. 2006, claiming priority to Japanese Patent Application No. 2005-226223 filed 4 Aug. 2005, the contents of which are incorporated herein by reference.

FIELD OF THE INVENTION

The invention relates to a movable body. More particularly, the invention relates to improvement of the operation system of a movable body, for example, an electric vehicle such as a fuel cell vehicle.

BACKGROUND OF THE INVENTION

Various fuel cell vehicles have been proposed. The fuel cell vehicles are electric vehicles in which a fuel cell is provided. The fuel cell generates electric power through chemical reaction between hydrogen and oxygen.

In such electric vehicles (fuel cell vehicles), a control needs to be executed to start and stop the operation of a fuel cell system (for example, refer to Japanese Patent Application Publication No. JP-A-2004-311222). For example, in general electric vehicles, an ignition switch is provided, and a controller executes a valve-opening control for a shut valve provided in a pipe for supplying fuel gas to a fuel cell when the ignition switch is operated (for example, refer to Japanese Patent Application Publication No. JP-A-2001-351667).

For example, in a known fuel cell system, a shut valve and an ignition switch are connected to a controller that includes a central processing unit (CPU), memory, and the like. A control program and the like are stored in the memory, and are used to control the shut valve based on a control signal from the ignition switch. In this fuel cell system, when the ignition switch is operated, the operation of the fuel cell system is started and stopped.

In the movable bodies such as the above-described electric vehicles, the operation of the fuel cell system is started and stopped only by operating the ignition switch. However, a control that starts and stops the operations of systems provided in the electric vehicle individually is not executed, or cannot be executed.

That is, in the electric vehicles, the operation of the entire fuel cell system is started and stopped based on only the instruction provided by the ignition switch. For example, there is no electric vehicle in which a driver can intentionally control the state of electric power generation in the fuel cell, taking into account the SOC (State of Charge) of a battery, or the driver can change the state of electric power generation according to driveability.

In the fuel cell system described in Japanese Patent Application Publication No. JP-A-2001-351667, the generation of electric power cannot be intentionally limited, though the operation of the fuel cell system can be started and stopped using the ignition switch. For example, it is not possible to provide an instruction to start or stop the operation of the fuel cell system, independently of running operation of the vehicle.

DISCLOSURE OF THE INVENTION

It is an object of the invention to provide a movable body such as a fuel cell vehicle, in which an occupant can intentionally limit the generation of electric power in a fuel cell.

A first aspect of the invention relates to a movable body that includes a fuel cell, a fuel supply means, a limit means, a body, a conversion means, a control portion, and an operating member. The fuel cell generates electric power through chemical reaction between hydrogen and oxygen. The fuel supply means supplies fuel containing the hydrogen to the fuel cell. The limit means limits the amount of the fuel supplied by the fuel supply means. The body includes a space in which an occupant is housed. The conversion means converts the electric power supplied from the fuel cell to driving force for driving the body. The control portion controls the operation of the conversion means. The operating member is disposed at a position where the operating member can be operated by the occupant housed in the body. The operating member provides an instruction to execute a control that limits the amount of the supplied fuel using the limit means, without stopping the operation of the control portion.

In a movable body such as an electric vehicle, a fuel cell system is basically operated in accordance with the operation of an ignition key. In contrast according to the invention, it is possible to provide an instruction for the fuel cell system, independently of the ignition switch. Further, the operating member is disposed at a position where the operating member can be operated by the occupant. Therefore, the occupant can voluntarily and intentionally operate the operating member.

The operating member may have an optical characteristic that is different from the optical characteristic of another operating member that provides an instruction to execute another control. Alternatively, the operating member may have a shape that is different from the shape of another operating member that provides an instruction to execute another control. In this case, because the operating member (for example, a switch) has a visual or tactual characteristic that is different from the visual or tactual characteristic of the other operating member (for example, the other switch), the occupant is less likely to operate the other operating member wrongly. Thus, the occupant can use the operating member more easily.

Further, the operating member may be disposed on a common operation panel on which another operating member that provides an instruction to execute another control is disposed. Alternatively, the operating member may be disposed closer to an ignition switch than another operating member is. In this case, because the operating member (for example, a switch) is disposed on the common operation panel on which the other operating member (for example, the other switch) is disposed, or disposed close to the ignition switch, the occupant can use the operating member far more easily.

A second aspect of the invention relates to a movable body that includes a fuel cell, a power generation stop means, a body, a conversion means, a control portion, and an operating member. The fuel cell receives gas and generates electric power. The power generation stop means stops the generation of electric power in the fuel cell. The body includes a space in which an occupant is housed. The conversion means converts the electric power supplied from the fuel cell to driving force for driving the body. The control portion controls the operation of the conversion means. The operating member is disposed at a position where the operating member can be operated by the occupant housed in the body. The operating member provides an instruction to execute a control that stops the generation of the electric power using the power generation stop means, without stopping the operation of the control portion.

A third aspect of the invention relates to a movable body that includes a fuel cell, a relay means, a body, a conversion means, a control portion, and an operating member. The fuel cell receives gas and generates electric power. The relay means allows and interrupts supply of electric power from the fuel cell. The body includes a space in which an occupant is housed. The conversion means converts the electric power supplied from the fuel cell to driving force for driving the body. The control portion controls the operation of the conversion means. The operating member is disposed at a position where the operating member can be operated by the occupant housed in the body. The operating member provides an instruction to execute a control that allows or interrupts the supply of the electric power using the relay means, without stopping the operation of the control portion.

In the movable body according to each of the first to third aspects, the state of electric power generation, for example, the operation of the fuel cell system can be intentionally controlled independently of the running operation of the movable body, by limiting the amount of the supplied fuel, by starting or stopping the generation of the electric power in the fuel cell, or by allowing or interrupting the supply of the electric power from the fuel cell. Further, by operating the operating member in this movable body, the state of electric power generation can be controlled without stopping the operation of the control portion in the fuel cell system.

Accordingly, the driver can intentionally control the state of electric power generation in the fuel cell, taking into account the SOC of the battery. Also, the driver can change the state of electric power generation according to driveability. Thus, the occupant can voluntarily and appropriately change the state of the fuel cell system.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein.

DETAILED DESCRIPTION OF THE PREFERRED EMBODIMENTS

Figure 1:
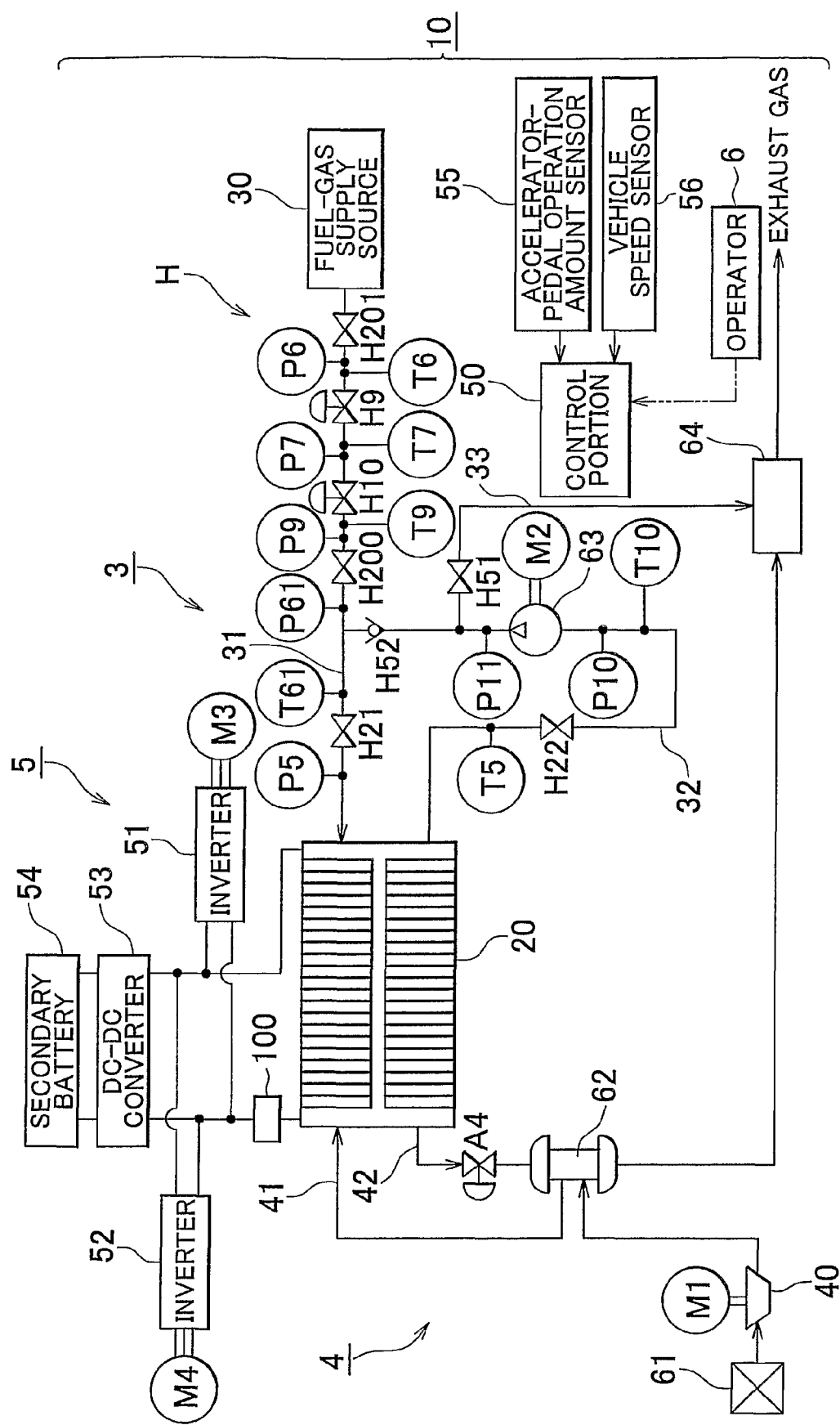
FIG. 1 is a block diagram showing an example of a fuel cell system provided in a fuel cell hybrid vehicle according to the embodiment of the invention.

Hereinafter, the configuration of the invention will be described in detail, based on an exemplary embodiment shown in the drawings.

Figure 2:
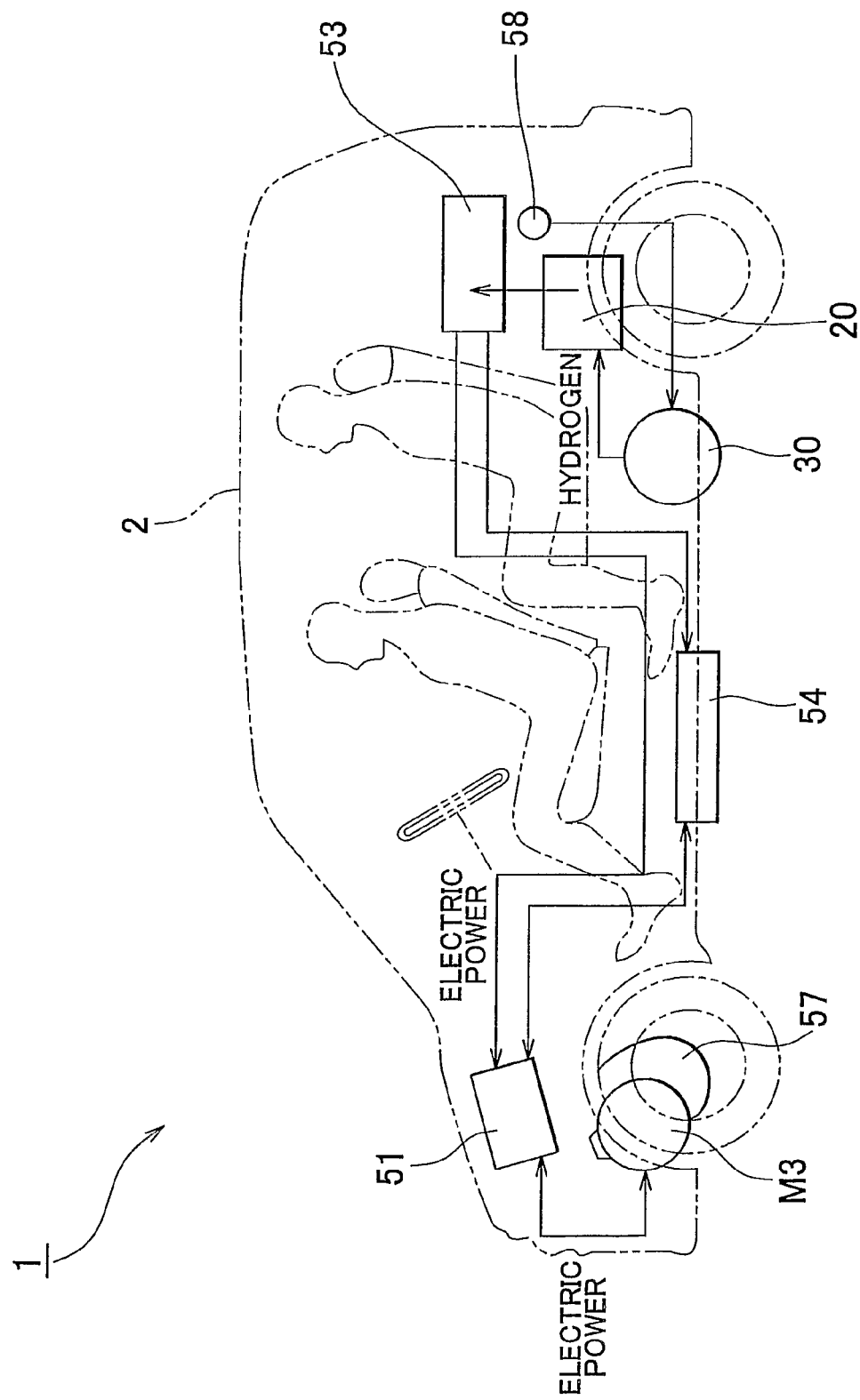
FIG. 2 is a schematic diagram showing the fuel cell hybrid vehicle according to the embodiment of the invention.
Figure 3:
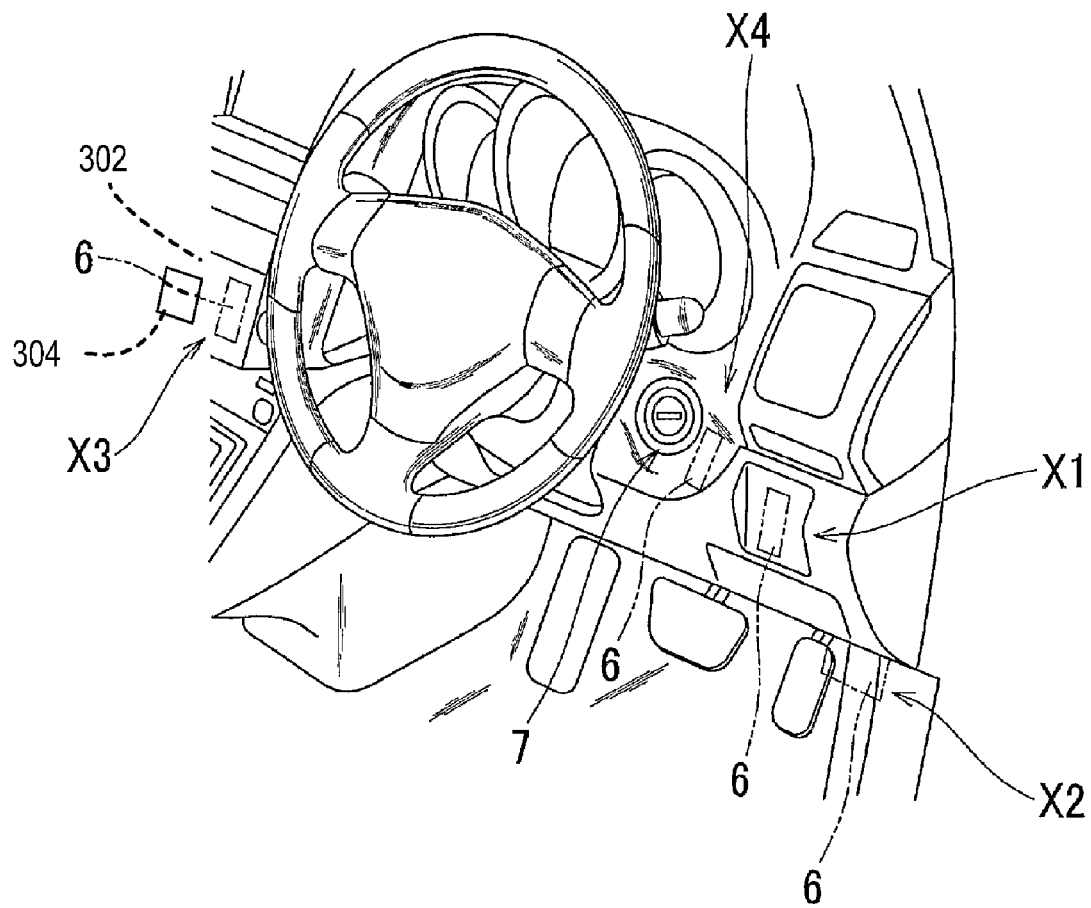
FIG. 3 is a perspective view showing the positions at which an operating member may be disposed near a driver seat in the fuel cell hybrid vehicle.

FIG. 1 to FIG. 3 show an example embodiment of the invention. A movable body according to the embodiment includes a fuel cell, a fuel supply means, a limit means, a body, a conversion means, a control portion, and an operating member. Examples of the movable body include means of transport, such as a ship and an airplane. In this embodiment, the invention is applied to a fuel cell hybrid vehicle shown in FIG. 2 (refer to FIG. 1, FIG. 2, and the like).

The body 2 of a fuel cell hybrid vehicle 1 according to the embodiment includes a space (vehicle compartment) in which an occupant is housed, and a space where devices and equipment such as a fuel cell system 10 are housed (refer to FIG. 2). In the vehicle compartment, seats for occupants, such as a driver seat, a passenger seat, and a rear seat, are provided. Further, devices required for driving the vehicle, such as a steering wheel, an accelerator pedal, a brake pedal, and instrument and gauges, are provided near the driver seat, as in an ordinary vehicle that uses gasoline as fuel (refer to FIG. 3).

In the space other than the vehicle compartment, a fuel cell stack 20, a fuel-gas supply source 30, a traction inverter 51, a DC-DC converter 53, a battery (secondary battery) 54, a transmission 57, a traction motor M3, and the like are provided (refer to FIG. 2). In FIG. 2, a filling port 58 for filling hydrogen that is used as fuel is shown.

The fuel cell system 10 is provided in the fuel cell hybrid vehicle 1. The fuel cell system 10 generates driving force for driving the fuel cell vehicle 1 (refer to FIG. 1 and the like). The fuel cell system 10 includes a fuel cell stack 20, a fuel supply means 3, a limit means H, a conversion means 5, and a control portion 50.

Also, an operating member 6 is disposed at a position where the operating member 6 can be operated by the occupant. The occupant in the body 2 can operate the fuel cell system 10 using the operating member 6. First, the outline of the fuel cell system 10 will be described.

FIG. 1 shows the schematic configuration of the fuel cell system 10 according to the embodiment of the invention. The fuel cell stack 20 provided in the fuel cell system 10 has a stack structure in which a plurality of single cells are stacked in series. For example, the fuel cell stack 20 includes a polymer electrolyte membrane fuel cell. The fuel cell system 10 includes the fuel supply means 3 for supplying fuel (for example, hydrogen) to the fuel cell stack 20, and an oxidizing gas supply means 4 for supplying oxidizing gas (for example, oxygen) to the fuel cell stack 20 (refer to FIG. 1).

The fuel supply means 3 supplies fuel containing hydrogen to the fuel cell stack 20 that generates electric power through chemical reaction between hydrogen and oxygen. For example, the fuel supply means 3 according to the embodiment includes a fuel-gas supply source 30, a fuel-gas supply passage 31, a fuel-gas circulation passage 32, and an anode off-gas passage 33 (refer to FIG. 1).

For example, the fuel-gas supply source 30 includes a hydrogen storage source such as a high-pressure hydrogen tank or a hydrogen storage tank. Fuel gas discharged from the fuel-gas supply source 30 flows to the anode (fuel electrode) of the fuel cell stack 20 through the fuel-gas supply passage 31. In the fuel-gas supply passage 31, a tank valve H201, a high-pressure regulator H9, a low-pressure regulator H10, a hydrogen supply valve H200, and an FC inlet valve H21 are provided from the upstream side to the downstream side. The high-pressure regulator H9 reduces the high pressure of the compressed fuel gas to medium pressure. The low-pressure regulator H10 further reduces the medium pressure of the fuel gas to low pressure (i.e., normal operating pressure).

Further, the fuel supply means 3 includes the limit means H for limiting the amount of the supplied fuel gas (refer to FIG. 1). Using the limit means H, the amount of the supplied fuel gas can be controlled. For example, the amount of the supplied fuel gas can be adjusted by changing the flow rate of the fuel gas per unit time, or the supply of the fuel gas can be stopped by reducing the flow rate to "0". For example, in this embodiment, a shut valve, such as the tank valve H201 or the hydrogen supply valve H200, can be used as the limit means H.

Hereinafter, the case where the tank valve (may be referred to as "main stop valve") H201 is used as the limit means H will be described.

Unreacted fuel gas is returned to the fuel cell stack 20 through the fuel-gas circulation passage 32. In the fuel-gas circulation passage 32, an FC outlet valve H22, a hydrogen circulation pump 63, and a check valve H52 are provided from the upstream side to the downstream side. The hydrogen circulation pump 63 appropriately increases the low pressure of the unreacted fuel gas discharged from the fuel cell stack 20. Then, the unreacted fuel gas is introduced to the fuel-gas supply passage 31.

The check valve H52 suppresses the backflow of the fuel gas from the fuel-gas supply passage 31 to the fuel-gas circulation passage 32. The anode off-gas passage 33 extends from a portion of the fuel-gas circulation passage 32. Hydrogen off-gas discharged from the fuel cell stack 20 is discharged to the outside of the fuel cell system 10 through the anode off-gas passage 33. In the anode off-gas passage 33, a purge valve H51 is provided.

Each of the tank valve H201, the hydrogen supply valve H200, the FC inlet valve H21, the FC outlet valve H22, and the purge valve H51 is a shut valve that allows or interrupts the supply of the fuel gas to the gas passage 31, 32, or 33, or the fuel cell stack 20. For example, each of the above-described valves is composed of an electromagnetic valve. As the electromagnetic valve, for example, an on/off valve, or a linear valve in which the opening amount is linearly adjusted by PWM control may be employed.

The oxidizing gas supply system 4 of the fuel cell stack 20 includes an air compressor 40, an oxidizing-gas supply passage 41, and a cathode off-gas passage 42 (refer to FIG. 1). The air compressor 40 compresses air taken from the atmosphere via an air filter 61, and supplies the compressed air to the cathode (oxygen electrode) of the fuel cell stack 20 as the oxidizing gas. After the oxidizing gas is used for cell reaction in the fuel cell stack 20, the oxygen off-gas is discharged to the outside of the fuel cell system 10 via the cathode off-gas passage 42.

Because the oxygen off-gas contains moisture generated by the fuel reaction in the fuel cell stack 20, the oxygen off-gas is in a high-humidity state. In a humidification module 62, moisture is exchanged between the oxidizing gas in a low-humidity state, which flows in the oxidizing-gas supply passage 41, and the oxygen off-gas in the high-humidity state, which flows in the cathode off-gas passage 42 so that the oxidizing gas supplied to the fuel cell stack 20 is appropriately humidified. The back pressure of the oxidizing gas supplied to the fuel cell stack 20 is adjusted by a pressure-adjustment valve A4 provided in the cathode off-gas passage 42 at a position near the outlet of the cathode.

The downstream portion of the cathode off-gas passage 42 is connected to a dilution device 64. Further, the downstream portion of the anode off-gas passage 33 is connected to the dilution device 64. After the dilution device 64 mixes and dilutes the hydrogen off-gas with the oxygen off-gas, the dilution device 64 discharges the mixed gas to the outside of the fuel cell system 10.

The conversion means 5 converts the electric power generated by the fuel cell stack 20 to driving force for driving the fuel cell hybrid vehicle 1. For example, in this embodiment, the conversion means 5 includes elements described below (refer to FIG. 1). That is, the voltage of part of DC electric power generated by the fuel cell stack 20 is reduced by the DC-DC converter 53, and the battery (secondary battery) 54 is charged with the electric power.

The traction inverter 51 and an auxiliary machine inverter 52 convert DC electric power supplied from at least one of the fuel cell stack 20 and the battery 54 to AC electric power. Then, the traction inverter 51 and the auxiliary machine inverter 52 supply the AC electric power to the traction motor M3 and the auxiliary machine motor M4, respectively. The auxiliary motor M4 indicates a motor M2 that drives the hydrogen circulation pump 63, and a motor M1 that drives the air compressor 40.

The control portion 50 determines the amount of electric power required for the fuel cell system 10 to generate (i.e., the sum of the amount of electric power required to drive the vehicle, and the amount of electric power required to drive the auxiliary machines), based on an accelerator-pedal operation amount detected by an accelerator-pedal operation amount sensor 55, a vehicle speed detected by a vehicle sensor 56, and the like. Then, the control portion 50 controls the fuel cell system 10 so that the amount of electric power generated by the fuel cell stack 20 matches a target electric power amount. More specifically, the control portion 50 adjusts the amount of supplied oxidizing gas by adjusting the rotational speed of the motor M1 that drives the air compressor 40. In addition, the control portion 50 adjusts the amount of the supplied fuel gas by adjusting the rotational speed of the motor M2 that drives the hydrogen circulation pump 63. Also, the control portion 50 adjusts the operating point (output voltage, and output electric current) of the fuel cell stack 20 by controlling the above-described conversion means 5 including the DC-DC converter 53.

In a high-pressure portion (i.e., the interval from the tank valve H201 to the hydrogen supply valve H200), pressure sensors P6, P7, and P9, and temperature sensors T6, T7, and T9 are provided. In a low-pressure portion (i.e., the interval from the hydrogen supply valve H200 to the FC inlet valve H21), a pressure sensor P61, and a temperature sensor T61 are provided. In an FC portion (i.e., the interval from the FC inlet valve H21 to the FC outlet valve H22), a pressure sensor P5 and a temperature sensor T5 are provided. In a circulation portion (i.e., the interval from the FC outlet valve H122 to the check valve H52), pressure sensors P10 and P11, and a temperature sensor T10 are provided. Each pressure sensor detects the pressure of the fuel gas. Each temperature sensor detects the temperature of the fuel gas.

The function of each pressure sensor will be described in more detail. The pressure sensor P6 detects the fuel-gas supply pressure of the fuel-gas supply source J30. The pressure sensor P7 detects the secondary pressure of the high-pressure regulator H9. The pressure sensor P9 detects the secondary pressure of the low-pressure regulator H10. The pressure sensor P61 detects the pressure in the low-pressure portion of the fuel-gas supply passage 31. The pressure sensor P5 detects the pressure at the inlet of the fuel cell stack 20. The pressure sensor P10 detects the pressure on the input port-side (i.e., on the upstream-side) of the hydrogen circulation pump 63. The pressure sensor P11 detects the pressure on the output port-side (i.e., on the downstream-side) of the hydrogen circulation pump 63.

The fuel cell hybrid vehicle 1 according to the embodiment includes the operating member 6 that provides an instruction to execute a control that limits the amount of the supplied fuel gas using the limit means H. Hereinafter, the operating member 6 will be described (refer to FIG. 1 to FIG. 3).

The operating member 6 is one of switches disposed at positions where the switches can be operated by the occupant in the vehicle compartment. In this embodiment, the operating member 6 is disposed as a switch that provides an instruction to execute the control that starts or stops the supply of the fuel gas (hydrogen gas), independently of the ignition switch 7 (refer to FIG. 3). In an ordinary control system for fuel supply, the fuel supply means is operated in accordance with the operation of the ignition switch. For example, when the ignition switch is turned off, the operation of the fuel supply means is stopped. As a result, the supply of the fuel gas is stopped. However, in this embodiment, the fuel supply means 3 can be operated independently of the ignition switch 7.

That is, even when the ignition switch 7 is not turned off, the supply of the fuel gas to the fuel cell stack 20 can be stopped by operating the operating member 6 to decrease the amount of the supplied fuel gas or stop the supply of the fuel gas. More specifically, for example, even when the fuel cell hybrid vehicle 1 is running, it is possible to decrease the amount of the supplied fuel gas or stop the supply of the fuel gas by operating the operating member 6 to provide the instruction to control the limit means H (in this embodiment, the tank valve (main stop valve) H201).

Accordingly, in the fuel cell hybrid vehicle 1 according to the embodiment, only the supply of the fuel gas can be limited independently of an instruction system for the control portion 50, without stopping the operation of the control portion 50 (or an ECU (Electronic Control Unit) provided in the control portion 50).

The ignition switch 7 in this embodiment is not limited to an insertion-type switch that is operated by inserting a key into a lock and turning the key. The ignition switch 7 may be a so-called intelligent key or the like that is operated by pushing a button, without inserting the key into a lock. It is possible to employ any device that is operated to start or stop the operation of the fuel cell system 10, as the ignition switch 7. That is, the ignition switch 7 may be operated using a key or a button.

Hereinafter, the manner in which the operating member 6 is disposed will be described. As described above, the operating member 6 is one of the switches disposed at positions where the switches can be operated by the occupant in the vehicle compartment. The term "the occupant in the vehicle compartment" includes an occupant other than a driver. However, in this embodiment, the operating member 6 is disposed near the driver seat, as well as other switches.

The position at which the operating member 6 is disposed is not limited to a specific position. The examples of the position at which the operating member 6 may be disposed will be described with reference to FIG. 3. The operating member 6 may be disposed at a position X1 (for example, a position at which a switch for turning on a fog lamp is disposed). When the operating member 6 is disposed at the position X1, it is relatively easy for the occupant to see and reach the operating member 6. Alternatively, the operating member 6 may be disposed at a position X2 (for example, a position at which a hood opener is disposed). When the operating member 6 is disposed at the position X2, it is relatively difficult for the occupant to see and reach the operating member 6.

Alternatively, the operating member 6 may be disposed at a position X3 on a center console or around the center console. For example, if it is considered that the operating member 6 is used as frequently as the other switches, the operating member 6 may be disposed on a common operation panel 302 on which the other switches (e.g., a switch or another operating member 304) are disposed so that the operating member 6 can be used as easily as the other switches. That is, the operating member 6 is appropriately disposed as well as the other switches.

The shape of the operating member 6 is not limited to a specific shape, and the specification of the operating member 6 is not limited to a specific specification The operating member 6 may be composed of a switch similar to the other switches. For example, the operating member 6 may be composed of a so-called seesaw type switch, or a button-type switch that changes the instruction each time a button is pushed. Alternatively, the operating member 6 may be composed of a lever that is moved to two positions. That is, preferably, the operating member 6 is composed of a switch which can be easily operated as intended by the driver, and whose operation can be easily checked.

However, because the operating member 6 in the embodiment is the switch that can stop the supply of the fuel gas even when the vehicle is running, preferably, the operating member 6 is disposed in such a manner that the operating member 6 can be clearly distinguished from the other switches.

Also, preferably, the operating member 6 is disposed in such a manner that the operating member 6 can be clearly distinguished from the ignition switch 7 to prevent the occupant from wrongly operating the ignition switch 7. The operating member 6 may be distinguished from the other switches in various manners. For example, the operating member 6 may have an optical characteristic that is different from the optical characteristics of the other switches so that the operating member 6 can be visually distinguished from the other switches. For example, the operating member 6 may be colored differently from the other switches. Alternatively, the operating member 6 may be provided with a back light.

Alternatively, the shape, contour, and size of the operating member 6 may be different from those of the other switches, or the surface of the operating member 6 may be treated differently from the surfaces of the other switches so that the operating member 6 can be tactually distinguished from the other switches. Alternatively, the operating member 6 may have both of a visual characteristic and a tactual characteristic. For example, the operating member 6 may have a characteristic shape to emphasize also the visual characteristic.

Further, the operating member 6 may be disposed at a position closest to the ignition switch 7, as compared to the other switches (for example, refer to a position X4 in FIG. 3). As described above, the ignition switch 7 is the device that is operated to start or stop the operation of the fuel cell system 10. Therefore, it is preferable that the operating member 6 that is operated for the fuel cell system 10 be disposed near the ignition switch 7, because the operating member 6 can be easily operated.

That is, if the switches for operating the same system are disposed close to each other, the driver can easily perceive the switches. Therefore, when the occupant wants to limit the supply of the fuel gas, the occupant can easily perceive and operate the operating member 6 near the ignition switch 7. Thus, the occupant does not need to look for the operating member 6.

As described above, the fuel cell hybrid vehicle 1 includes the operating member 6 that can instruct the limit means H (in this embodiment, the tank valve H201) to decrease the amount of the supplied fuel gas or to stop the supply of the fuel gas, independently of the ignition switch 7. In other words, the fuel cell hybrid vehicle 1 includes the operating member 6 that provides the instruction, independently of the ignition switch 7 that provides the instruction on the operation of the ECU (Electronic Control Unit) of the control portion 50. Therefore, by operating the operating member 6, it is possible to provide the instruction to execute the control that starts or stops the operation of the fuel cell system 10, independently of the running operation of the fuel cell hybrid vehicle 1.

When an ordinary hybrid vehicle that does not include a fuel cell is running using electric power, an engine is stopped or is placed in an idling state. Likewise, for example, when the fuel cell hybrid vehicle 1 is running using the electric power stored in the battery (secondary battery) 54, the fuel cell system 10 can be forcibly and temporarily stopped or placed in a low-output state, by limiting the supply of the fuel gas. When the fuel cell system 10 is in the low-output state, the fuel cell system 10 is substantially stopped.

When the ordinary hybrid vehicle is running using electric power, basically, the ordinary hybrid vehicle is automatically controlled. In contrast, in the fuel cell hybrid vehicle 1 in the embodiment, the driver can voluntarily operate the fuel cell system 10. For example, by checking the SOC of the battery using a monitor, and decreasing the amount of the supplied fuel gas in advance before running on a downward slope, the amount of recovered electric power can be increased and fuel efficiency can be improved. In addition, by operating the operating member 6 again, the control that temporarily limits the supply of the fuel gas can be stopped, and the operation of the fuel cell system 10 can be easily restarted.

In addition, the above-described operating member 6 has the following advantages. That is, the shut valves such as the tank valve H201 can be reliably operated using the operating member 6. Also, for example, the driver at the driver seat can start and stop the supply of the fuel gas (hydrogen gas), by operating the operating member 6. Further, as described above, the main stop valve (the tank valve H201) in the embodiment is the shut valve that is composed of the electromagnetic valve. Even if power for operating the main stop valve (in this case, electromagnetic power) is insufficient, the main stop valve is automatically closed.

The operating member 6 may have various purposes or functions. For example, the operating member 6 may have five purposes or functions described below. The operating member 6 may have any one of the five purposes or functions. Alternatively, the operating member 6 may have a plurality of purposes or functions among the five purposes or functions in combination.

The first purpose or function is to limit the supply of the fuel gas to keep stopping the generation of electric power in the fuel cell until the operating member 6 is operated again. If the operating member 6 has the first purpose or function, the generation of electric power can be stopped until an instruction is provided, for example, based on the determination made by a rescue crew or the driver in an emergency. Thus, the first purpose or function is advantageous in terms of safety.

Alternatively, the operating member 6 may stop the generation of electric power in the fuel cell for a predetermined time, and the generation of electric power may be automatically restarted after the predetermined time elapses, taking into account, for example, a condition relating to the SOC (State of Charge). In this case, the generation of electric power can be restarted taking into account drivability.

Alternatively, the operating member 6 may stop the generation of electric power in the fuel cell for a predetermined time, and the generation of electric power may be automatically restarted after the predetermined time elapses, regardless of the condition relating to the SOC (State of Charge). In this case, the operating member 6 is an effective means for preventing the occupant from forgetting to provide the instruction to restart the generation of electric power in the fuel cell.

The second purpose or function of the operating member 6 is to give permission to forcibly stop the generation of electric power in the fuel cell, based on a vehicle speed or a shift position. If the operating member 6 has the second purpose or function, for example, the operating member 6 can be used as a means for giving an instruction to stop the generation of electric power after an abnormality occurs and the vehicle is stopped. In the case where refuge running can not be performed for a required distance if the generation of electric power in the fuel cell is forcibly stopped during refuge running, the generation of electric power in the fuel cell can be stopped after refuge running is performed for the required distance. The phrase "refuge running is performed" signifies that, for example, a vehicle runs to an auto-repair shop such as the shop of a dealer, or a safe place, when failure occurs in the vehicle.

Alternatively, the operating member 6 may be used as a means for giving permission to restart the fuel cell system 10 and to generate electric power after the fuel cell system 10 is stopped. In this case, for example, the fuel cell system 10 can be restarted, and the battery 54 can be charged with electric power after the fuel cell system 10 is once stopped.

The third purpose or function is to stop the generation of electric power in the fuel cell to check the function of each component. If the operating member 6 has the third purpose or function, the operating member 6 is useful, for example, when functional components or the like are checked based on an instruction provided by the driver. For example, the operating member 6 is used when hydrogen is intentionally sprayed to a hydrogen detector to determine whether the hydrogen detector can detect a leak of hydrogen. By using the operating member 6 that has the third purpose or function, the work required to check components during vehicle inspection can be simplified.

The fourth purpose or function is to open only a main stop valve for a required hydrogen tank among a plurality of hydrogen tanks. Although the detail of the fuel-gas supply source 30 is not shown in FIG. 1, a plurality of hydrogen tanks may be provided, and may be used by turns. In this case, if the operating member 6 has the fourth purpose or function, the operating member 6 can be used to provide instructions to open and close the plurality of hydrogen tanks. Also, the operating member 6 can be used to open and close only a main stop valve for a hydrogen tank that has hydrogen in an amount sufficient for driving the vehicle.

The fifth purpose or function is to give permission to generate electric power by a fuel cell system only when the SOC of the battery 54 decreases. If the operating member 6 has the fifth purpose or function, the operating member 6 can be used, for example, only at a point at which electric power can be generated with high efficiency. In this case, the configurations of auxiliary machines are simplified.

In the above-described embodiment, even when the supply of hydrogen to the fuel cell or the generation of electric power in the fuel cell is stopped, the fuel cell hybrid vehicle 1 may run using the electric power supplied from an electric power accumulation device (the battery 54 in this embodiment).

The above-described embodiment is an example embodiment of the invention, and the invention is not limited to the above-described embodiment. Various modifications may be made without departing from the true spirit of the invention.

For example, in the embodiment, the limit means H (the tank valve H201 in the above-described embodiment) is controlled using the operating member 6. However, the invention is not limited to this configuration. The shut valve other than the tank valve H201, more specifically, the hydrogen supply valve H200 and the FC inlet valve H21 may be used as the limit means H. That is, any valve that can limit the supply of the fuel gas to the fuel cell stack 20 may be controlled and used as the limit means H.

In the embodiment, the shut valve is used to limit the supply of the fuel gas. Other configurations will be briefly described. For example, the operating member 6 may instruct a relay means 100 to allow or interrupt the supply of electric power from the fuel cell stack 20 to a device that consumes electric power. Alternatively, the operating member 6 may instruct a power generation stop means to start or stop the generation of electric power in the fuel cell stack 20.

Also, in the embodiment, the fuel containing hydrogen is supplied. The term "fuel" signifies not only "pure hydrogen" but also "methanol supplied to a fuel cell" and "methanol for reforming". As the fuel supply means, for example, a liquid fuel supply container, in which hydrogen is stored in the form of liquid, may be employed, as well as the high-pressure tank.

Further, the fuel supply means may be a hydrogen generation device that generates gas that contains a high concentration of hydrogen, by reforming hydrocarbon fuel such as ethanol. That is, the invention can be applied to all the cases where a means other than the ignition switch 7 is used to provide the instruction to limit the supply of fuel, regardless of types of the fuel. Also, as the limit means, a passage adjustment device that decreases the cross sectional area of the fuel passage, for example, a variable regulator, may be employed, as well as a passage interruption device that interrupts the fuel passage, for example, the shut valve (opening/closing valve) such as the tank valve H201 and the hydrogen supply valve H200.

The invention claimed is:

1. A movable body comprising:
    a fuel cell;
    a fuel supply portion for supplying fuel to the fuel cell;
    a limit portion for limiting an amount of the fuel supplied by the fuel supply portion;
    a body that includes a space in which an occupant is housed;
    a conversion portion for converting electric power supplied from the fuel cell to driving force for driving the body;
    a control portion that controls an operation of the conversion portion; and
    an operating member which is disposed at a position where the operating member can be operated by the occupant housed in the body, and which provides an instruction to execute a control that limits the amount of the supplied fuel using the limit portion, without stopping an operation of the control portion,
    wherein the limit portion is a main stop valve for a fuel tank,
    wherein the operating member provides the instruction, independently of an ignition switch that provides the instruction on the operation of the control portion, and
    wherein the instruction to execute limit control cannot be overridden by the control portion.

2. The movable body according to claim 1, wherein the operating member has an optical characteristic that is different from an optical characteristic of another operating member that provides an instruction to execute another control.

3. The movable body according to claim 1, wherein the operating member has a shape that is different from a shape of another operating member that provides an instruction to execute another control.

4. The movable body according to claim 1, wherein the operating member is disposed on a common operation panel on which another operating member that provides an instruction to execute another control is disposed.

5. The movable body according to claim 1, wherein the operating member is disposed closer to an ignition switch than another operating member is.

6. The movable body according to claim 1, wherein the fuel contains hydrogen;
    the fuel supply portion supplies the fuel that contains the hydrogen to the fuel cell; and
    the fuel cell generates the electric power through chemical reaction between the hydrogen and oxygen.

7. A movable body comprising:
    a fuel cell;
    a relay portion for allowing and interrupting supply of electric power from the fuel cell;
    a body that includes a space in which an occupant is housed;
    a conversion portion for converting the electric power supplied from the fuel cell to driving force for driving the body;
    a control portion that controls an operation of the conversion portion; and
    an operating member which is disposed at a position where the operating member can be operated by the occupant housed in the body, and which provides an instruction to execute a control that allows or interrupts the supply of the electric power using the relay portion, without stopping an operation of the control portion,
    wherein the operating member provides the instruction independently of an ignition switch that provides the instruction on the operation of the control portion, and
    wherein the instruction to execute limit control cannot be overridden by the control portion.

8. The movable body according to claim 7, wherein the fuel cell receives gas and generates the electric power.

9. The movable body according to claim 8, wherein the fuel cell receives fuel gas and oxidizing gas as the gas, and generates the electric power.

10. A movable body comprising:
    a fuel cell;
    a fuel supply device that supplies fuel to the fuel cell;
    a limit device that limits an amount of the fuel supplied by the fuel supply device;
    a body that includes a space in which an occupant is housed;
    a conversion device that converts electric power supplied from the fuel cell to driving force for driving the body;
    a control portion that controls an operation of the conversion device; and
    an operating member which is disposed at a position where the operating member can be operated by the occupant housed in the body, and which provides an instruction to execute a control that limits the amount of the supplied fuel using the limit device, without stopping an operation of the control portion,
    wherein the limit device is a passage adjustment device,
    wherein the operating member provides the instruction independently of an ignition switch that provides the instruction on the operation of the control portion, and
    wherein the instruction to execute limit control cannot be overridden by the control portion.

11. A movable body comprising:
    a fuel cell;
    a relay device that allows and interrupts supply of electric power from the fuel cell;
    a body that includes a space in which an occupant is housed;
    a conversion device that converts the electric power supplied from the fuel cell to driving force for driving the body;
    a control portion that controls an operation of the conversion device; and
    an operating member which is disposed at a position where the operating member can be operated by the occupant housed in the body, and which provides an instruction to execute a control that allows or interrupts the supply of the electric power using the relay device, without stopping an operation of the control portion,
    wherein the operating member provides the instruction independently of an ignition switch that provides the instruction on the operation of the control portion, and
    wherein the instruction to execute limit control cannot be overridden by the control portion.

* * * * *